United States Patent [19]
Woods

[11] Patent Number: 5,217,046
[45] Date of Patent: Jun. 8, 1993

[54] TOP ENTRY FLOW CONTROL VALVE WITH TWO SETS OF ORIFICES

[75] Inventor: John B. Woods, Tulsa, Okla.

[73] Assignee: Baker Hughes Incorporated, Houston, Tex.

[21] Appl. No.: 919,687

[22] Filed: Jul. 27, 1992

[51] Int. Cl.⁵ .............................................. F16K 3/00
[52] U.S. Cl. .......................... 137/614.11; 137/625.3; 137/625.31; 251/208
[58] Field of Search ........... 137/614.11, 625.3, 625.31, 137/625.32; 251/208, 209

[56] References Cited

U.S. PATENT DOCUMENTS

| | | | |
|---|---|---|---|
| 3,792,872 | 2/1974 | Jones | 251/209 X |
| 4,098,294 | 7/1978 | Woods | 137/614 |
| 4,331,176 | 5/1982 | Parkison | 137/614.11 X |
| 4,603,834 | 8/1986 | Hendrick | 251/121 |
| 4,901,977 | 2/1990 | Hendrick | 251/249 |
| 4,967,787 | 11/1990 | Taylor | 137/316 |
| 5,020,568 | 6/1991 | Taylor | 137/316 |
| 5,025,832 | 6/1991 | Taylor | 137/625 |
| 5,025,833 | 6/1991 | Hendrick | 137/625 |
| 5,054,521 | 10/1991 | Hendrick | 137/625 |
| 5,063,954 | 11/1991 | Hendrick | 137/625 |
| 5,088,689 | 2/1992 | Hendricks | 251/304 |

Primary Examiner—Gerald A. Michalsky
Attorney, Agent, or Firm—Dunlap, Codding & Lee

[57] ABSTRACT

A top entry flow control valve having a body with an inlet port, an outlet port and an access opening. The body has a cavity connected with the access opening and communicating with the inlet port and outlet port to allow fluid flow through the valve body. A pair of discs with orifices are positioned within the cavity to control flow into the outlet port by rotating one of the discs to change the degree of alignment between the disc orifices. A sleeve and rotatable cylinder are located within the cavity to control flow from the inlet port. The sleeve has a bore which receives the cylinder and a side wall with orifices extending into the bore. The cylinder has an open end which extends into the cylinder to form a chamber and a side wall with orifices penetrating into the chamber. The open end of the cylinder is attached to the rotatable disc. By rotating the cylinder, the alignment of the sleeve orifices with the cylinder orifices is changed to control flow from the inlet port into the chamber. A cover is removably attached over the access opening and secures the sleeve, cylinder and discs in the cavity. A valve stem extends from the cylinder through the cover to allow turning the cylinder and rotatable disc without removing the cover. A hub is attached to the valve stem and has an indicator band to show the flow position of the valve.

24 Claims, 4 Drawing Sheets

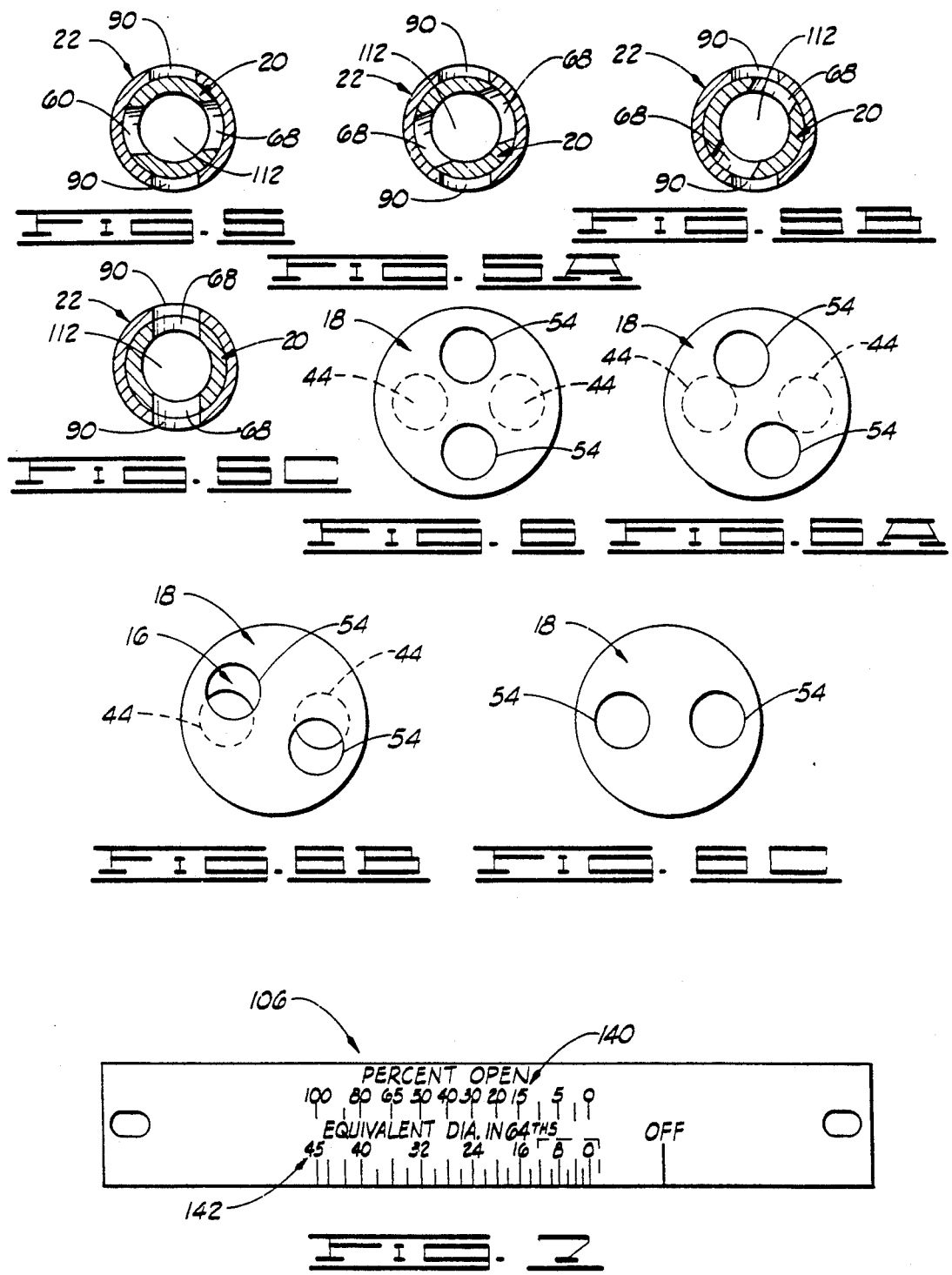

TOP ENTRY FLOW CONTROL VALVE WITH TWO SETS OF ORIFICES

FIELD OF THE INVENTION

The present invention relates generally to flow control of choke valves and, more particularly, but not by way of limitation, to top entry flow control valves with two sets of orifices.

SUMMARY OF THE INVENTION

The present invention comprises a valve body with an inlet port, an outlet port and a side wall with an access opening. The body has a cavity which connects with the access opening and has fluid communication between the inlet port and the outlet port to allow fluid flow through the body of the valve.

A stationary disc and a rotatable disc are positioned in engagement with one another in the cavity to control flow to the outlet port. A plurality of orifices extend through each disc. As the rotatable disc is turned, the degree of alignment between the disc orifices is altered and the fluid flow allowed through the disc orifices to the outlet port is changed.

A sleeve and rotatable cylinder are positioned within the cavity to control flow from the inlet port. The sleeve is secured to the body within the cavity and has a bore which matingly receives the rotatable cylinder. The sleeve has a side wall with a plurality of orifices extending into the bore of the sleeve.

The rotatable cylinder has a closed end and an open end extending into the cylinder to form a chamber within the cylinder. The cylinder has a side wall with a plurality of orifices extending into the chamber. As the cylinder is turned, the area of alignment between the orifices of the cylinder and sleeve is changed to adjust the fluid flow from the inlet port into the chamber.

The valve has a cover which is bolted over the access opening and secures the sleeve, cylinder and discs in place within the cavity of the valve body. A valve stem is attached to the rotatable cylinder and extends through the cover to allow adjustment of the flow position of the valve. The cylinder, in turn, is attached to the rotatable disc to provide simultaneous rotation of the cylinder and rotatable disc.

A hub is attached to the end of valve stem, which protrudes through the cover. A pair of cross bores extend through the hub for insertion of a bar to facilitate turning the hub and, in turn, the valve stem. An indicator band is fastened to the hub to provide a visual indication of the flow control position of the valve.

One object of the present invention is to provide a flow control valve which can be readily serviced, either to make repairs or to change orifice sizes, without removing the valve from the flow line.

Another object of the present invention is to provide a flow control valve having simultaneously adjustable inlet and outlet orifices, dividing pressure drop through the valve into two stages.

Other objects, advantages and features of the present invention ar apparent from the following detailed description when read in conjunction with the accompanying drawings and appended claims.

BRIEF DESCRIPTION OF THE DRAWINGS

FIG. 5 is a cross-sectional view taken along lines 5—5 of FIG. 3 wherein the orifices of the sleeve and the orifices of the cylinder are in a closed position.

FIG. 5a is the same view as FIG. 5, but with the cylinder rotated to place the orifices of the sleeve and the cylinder in a nearly open position.

FIG. 5b is the same view as FIG. 5, but with the cylinder rotated to place the orifices of the sleeve and the cylinder in a half open position.

FIG. 5c is the same view as FIG. 5, but with the cylinder rotated to place the orifices of the sleeve and the cylinder in a fully open position.

FIG. 6 is a cross-sectional view along lines 6—6 of FIG. 3 wherein the orifices of the stationary disc and the orifices of the rotatable disc are in a closed position.

FIG. 6a is the same view as FIG. 6, but with the rotatable disc turned to place the orifices of the rotatable and stationary discs in a nearly open position.

FIG. 6b is the same view as FIG. 6, but with the rotatable disc turned to place the orifices of the rotatable and stationary discs in a half open position.

FIG. 6c is the same view as FIG. 6, but with the rotatable disc turned to place the orifices of the rotatable and stationary discs in a fully open position.

FIG. 7 is a plan view of the flow position indicator band of the flow control valve shown in FIG. 1.

DETAILED DESCRIPTION OF THE PREFERRED EMBODIMENTS

Figure 1:
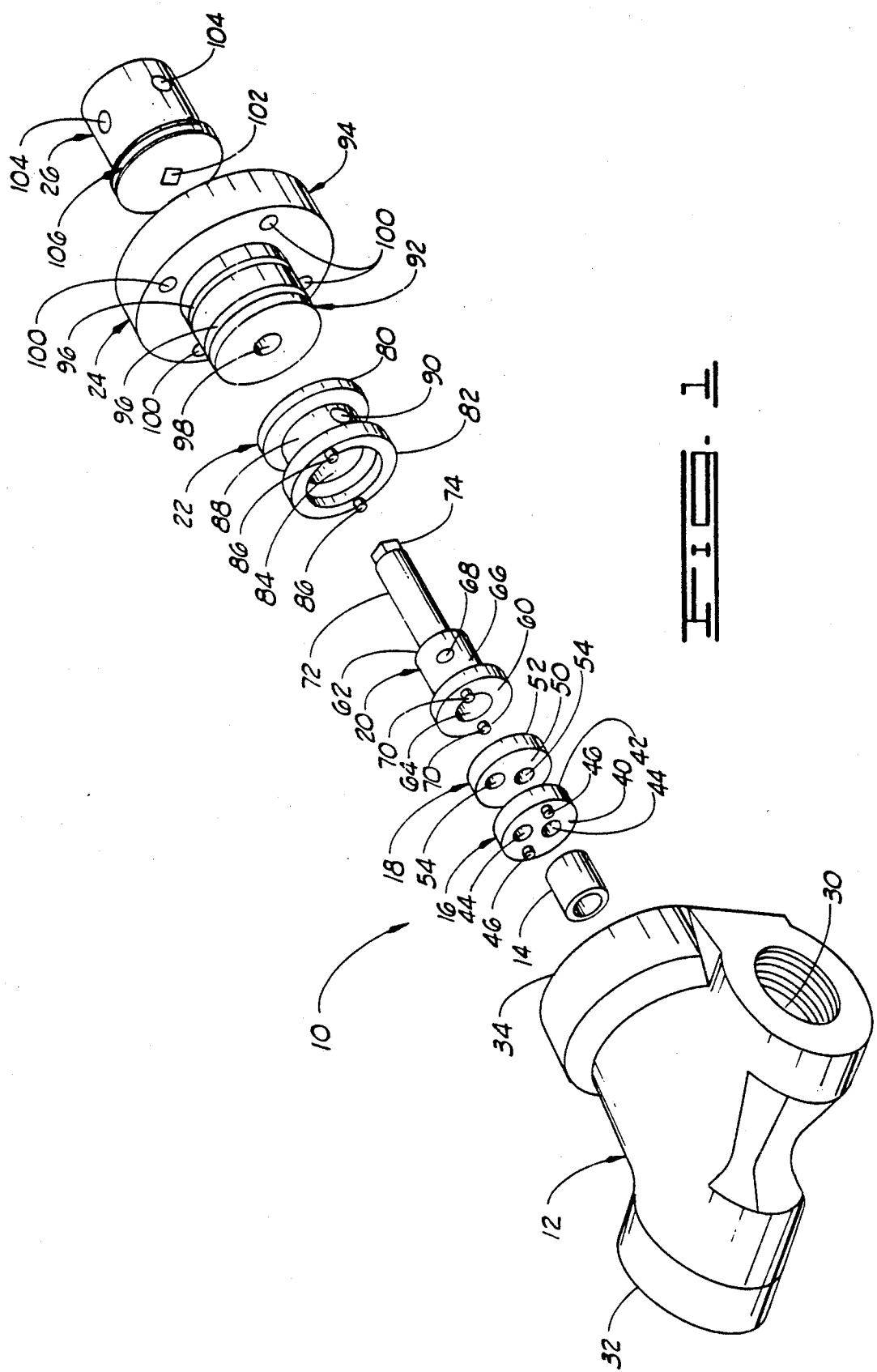
FIG. 1 is an exploded, perspective view of a flow control valve constructed in accordance with the present invention.

Referring to the drawings in general, and to FIG. 1 in particular, shown therein and designated by the general reference numeral 10 is a flow control valve which includes a body 12, a wear sleeve 14, a stationary disc 16, a rotatable disc 18, a rotatable cylinder 20, a sleeve 22, a cover 24 and a hub 26.

The body 12 includes an inlet port 30, an outlet port 32 and an access opening 34 for top entry into the valve body 12. As illustrated by FIG. 1, the wear sleeve 14, the stationary disc 16, the rotatable disc 18, the rotatable cylinder 20 and sleeve 22 are insertable into the body 12 through the access opening 34.

The wear sleeve 14, a tubular cylinder of stainless steel or the like, is placed in the valve body 12 first. The wear sleeve 14 may be used to prevent cavitation of the inside walls of the valve body 12 by high fluid pressure drop.

With continued reference to FIG. 1, the stationary and rotatable discs 16 and 18 are next positioned within the valve body 12. The stationary and rotatable discs 16 and 18 are typically made of ceramic or tungsten carbide. When installed in the valve body 12, the adjacent circular faces of the discs 16 and 18 are in engagement with one another.

The stationary disc 16 has an outlet side 40 facing the wear sleeve 14 and an inlet side 42 engaging the rotatable disc 18. A pair of orifices 44 extend through the stationary disc 16 and a pair of pins 46 extend from the outlet side 40 of the stationary disc 16. The pins 46 extend into pin openings within the valve body 12 to prevent rotation of the stationary disc 16. When installed in the valve body 12 the orifices 44 of stationary disc 16 are in fluid communication with the outlet port 32 through the wear sleeve 14.

The rotatable disc 18 has an outlet side 50 in contact with the stationary disc 16 and an inlet side 52 in contact with the rotatable cylinder 20. A pair of orifices 54 extend through the rotatable disc 18. The inlet side 52 of the rotatable disc 18 has a pair of pin holes (not shown) for connection of the rotatable disc 18 to the cylinder 20.

Continuing to refer to FIG. 1, the rotatable cylinder 20 has an open end 60 and a closed end 62. The open end 60 has an opening which extends into the cylinder 20 to form a chamber within the cylinder 20. The cylinder 20 has a side wall 66 with a pair of diametrically opposed orifices 68 extending through the side wall 66 into the chamber of the cylinder 20. Only one of the orifices 68 in the cylinder 20 is visible in FIG. 1. A pair of pins 70 extend from the open end 60 of the cylinder 20 and into the pin holes of the rotatable disc 18 to connect the cylinder 20 to the rotatable disc 18.

A valve stem 72 extends from the closed end 62 of the cylinder 20. The valve stem 72 has an end 74 which is square, hexagonal or the like for attachment of the hub 26.

The sleeve 22 is a tubular cylinder of stainless steel, steel alloy or the like. The sleeve 22 has an access end 80 and an outlet end 82 and a through bore 84 extending from the access end 80 to the outlet end 82. The outlet end 82 of the sleeve 22 has a pair of pins 86 for insertion into pin holes (not shown in FIG. 1) in the valve body 12 to prevent rotation of the sleeve 22. The sleeve 22 has a side wall 88 with a pair of diametrically opposed orifices 90 extending into the bore 84. When installed within the valve body 12, the orifices 90 of the sleeve 22 are in fluid communication with the inlet port 30.

The bore 84 is shaped to matingly receive the cylinder 20 through the outlet end 82 of the sleeve 22. When the cylinder 20 is rotated within the bore 84 of the sleeve 22, the orifices 90 and 68 of the sleeve 22 and the cylinder 20, respectively, align in varying degree to change the amount of fluid communication between the inlet port 30 and the chamber of the cylinder 20.

With continued reference to FIG. 1, the cover 24 has an insertion portion 92 which fits into the valve body 12 through the access opening 34 and a flange 94 which engages the valve body 12 around the access opening 34. A pair of annular grooves 96 extend around the insertion portion 92 for installation of elastomeric O-rings to provide a fluid seal between the insertion portion 92 of the cover 24 and the valve body 12.

A valve stem bore 98 extends through the cover 24 to receive the valve stem 72 of the cylinder 20. A plurality of bolt holes 100 extend through the flange 94 of the cover 24 to receive bolts for fastening the cover 24 to the valve body 12.

The end 74 of the valve stem 72 protrudes through the cover 24 and the hub 26 is secured to the protruding end 74 of the valve stem 72. The hub 26 has an opening 102 shaped to mate with the square or hexagonal end 74 of the valve stem 72.

The hub 26 also has a pair of cross bores 104 to facilitate turning the hub 26 and valve stem 72. A bar may be inserted into one of the cross bores 104 to provide leverage to rotate the hub 26, valve stem 72, cylinder 20 and rotatable disc 18 to change flow control positions of the valve 10. A indicating band 106 is provided on the hub 26 to provide a visual indication of the flow control position of the valve 10.

Figure 2:
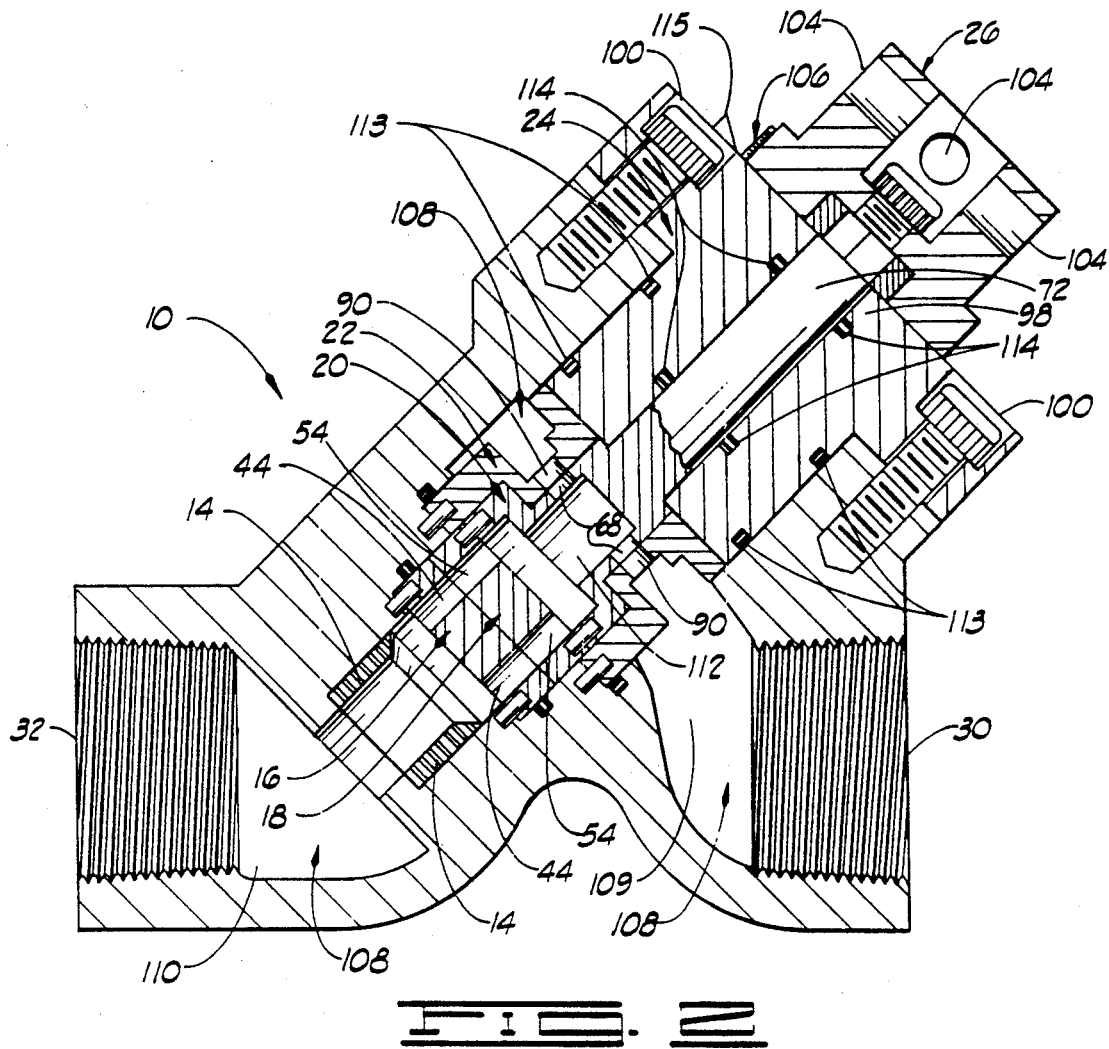
FIG. 2 is a partly diagrammatical, cross-sectional view of the flow control valve shown in FIG. 1.

Referring now to FIG. 2, the construction of the valve 10 is described in greater detail. The inlet port 30 and outlet port 32 are shown to be threaded. It should be appreciated, however, that the inlet port 30 and outlet port 32 may be connected to the flow line with bolted flanges or with any other conventional pipeline connecting arrangement.

A cavity 108 is formed in the valve body 12 to accommodate the components of the valve 10 and to allow fluid flow between the inlet port 30 at an inlet area 109 of the cavity 108 and the outlet port 32 at an outlet area 110 of the cavity 108. The cavity 108 communicates the access opening 34 as well as with the inlet port 30 and the outlet port 32.

As illustrated by FIG. 2, the inlet area 109 of the cavity 108 curves angularly upward from the inlet port 30 to the orifices 90 of the sleeve 22 and then angularly downward to the outlet port 32. Thus the path of fluid flow through the valve 10 is from the inlet port 30 through the orifices 90 of the sleeve 22 and the orifices 68 of the cylinder 20 into the chamber, designated by reference numeral 112, of the cylinder 20.

From the chamber 112 of the cylinder 20, the flow proceeds through the orifices 54 of the rotatable disc 18 and the orifices 44 of the stationary disc 16, through the wear sleeve 14 and out of the valve 10 through the outlet port 32.

Figure 3:
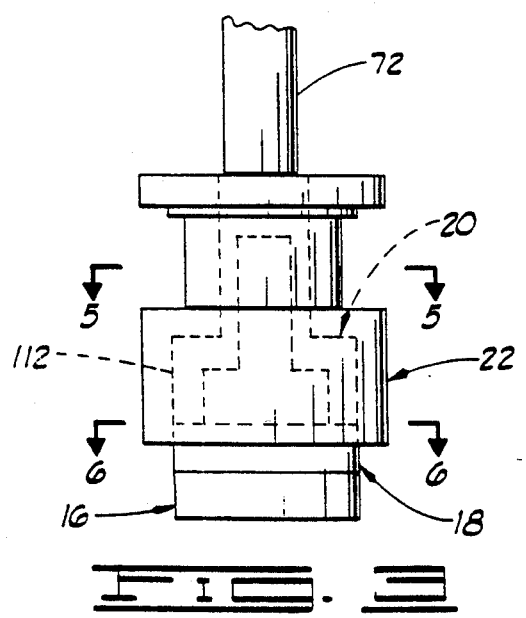
FIG. 3 is a side view of the sleeve, rotatable cylinder, stationary disc and rotatable disc of the flow control valve shown in FIG. 1.

As shown in FIGS. 2 and 3, the stationary disc 16 and the rotatable disc 18 fit against on another and the cylinder 20 fits closely within the sleeve 22. A portion of the rotatable disc 18 extends into the bore 84 of the sleeve 22. Thus the rotatable disc 18 is contiguous with the inside wall of the sleeve 22 and the inside wall of the valve body 12.

As illustrated by FIG. 2, the valve stem 72 of the cylinder 20 extends through the valve stem bore 98 of the cover 24. The cover 24 is bolted to the valve body 12 and abuts the sleeve 22 and cylinder 20 to secure the sleeve 22, the cylinder 20, and the discs 18 and 16 within the cavity 108 of the valve body 12.

As described previously, the cover 24 has annular grooves 96 for elastomeric O-ring seals 113 to provide a fluid seal between the cover 24 and the valve body 12. In addition, the valve stem bore 98 of the cover 24 has a pair of annular grooves for another set of elastomeric O-ring seals 114 to prevent fluid leakage between the valve stem 72 and the cover 24.

The hub 26 is attached to the end 74 of the valve stem 72 in any conventional manner. A threaded bolt, Allen screw or other such fastener may be used to secure the hub 26 to the valve stem 72.

As previously mentioned, the upper end of the hub 26 has the pair of cross bores 104 for turning the hub 26 and valve stem 72. To change the flow control position of the valve 10, an operator typically inserts a bar into one of the cross bores 104 in order to apply sufficient leverage to the hub 26. Of course, any suitable arrangement for turning the hub 26 and valve stem 72 may be employed.

Continuing to refer to FIG. 2, the flow control position indicator band 106 is attached to the outer surface of the hub 26 near the cover 24. A raised arrow 115, notch or mark is placed on the surface of the cover 24 to designate the flow position of the valve 10 on the indicator band 106.

Figure 4:
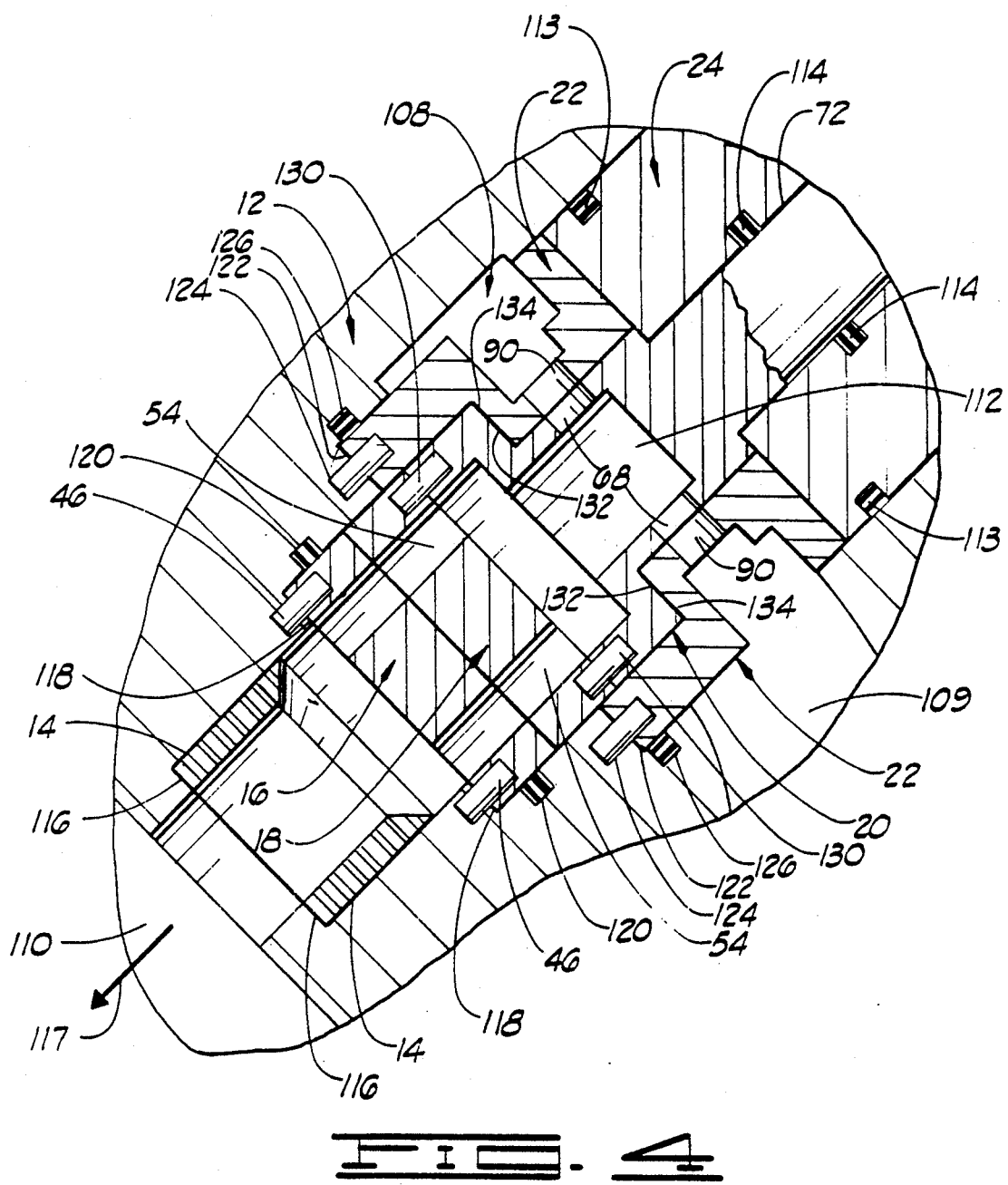
FIG. 4 is an enlarged view of a central portion of the flow control valve shown in FIG. 2.

Referring now to FIG. 4, the valve body 12 has an outlet annular shoulder 116 engaging the wear sleeve 14 to prevent movement of the wear sleeve 14 in the flow direction indicated by direction arrow 117. The wear sleeve 14 is typically pressed into position against the outlet annular shoulder 116, but may be held in place by pins (not shown) or other suitable securing arrangements.

The valve body 12 also has an intermediate annular shoulder 118 which engages the stationary disc 16 to prevent movement of the stationary disc 16 in the flow direction 117. The intermediate annular shoulder 118 has a pair of pin openings to receive the pins 46 extending from the stationary disc 16. The pins 46 keep the stationary disc 16 from rotating within the valve body 12.

An annular groove is formed in the valve body 12 to encircle a medial portion of the stationary disc 16. An elastomeric O-ring seal 120 is positioned within this groove to provided a fluid seal between the stationary disc 16 and the valve body 12.

With continued reference to FIG. 4, the valve body 12 has an inlet annular shoulder 122 engaging the sleeve 22 to prevent movement of the sleeve 22 in the flow direction 117. The sleeve 22 is held against rotation within the valve body 12 in much the same manner as the rotatable disc 16. The inlet annular shoulder 122 has a pair of pin openings which receive sleeve pins 124 extending from the sleeve 22. The sleeve pins 124 extend into the pin openings of the inlet annular shoulder 122 and the sleeve 22 to prevent rotation of the sleeve 22.

The valve body 12 also includes an annular groove encircling a portion of the sleeve 22. An elastomeric O-ring seal 126 is placed in this annular groove to provide a fluid seal between the sleeve 22 and the valve body 12.

Focusing now on the cylinder 20 in FIG. 4, the cylinder 20 and the rotatable disc 18 are connected by a pair of pins 130. In this manner, rotating the cylinder 20 simultaneously rotates the rotatable disc 18.

Toward the inlet area 109 of the cavity 108, the chamber 112 of the cylinder 20 is reduced in diameter by a reducing shoulder 132. The sleeve 22 has a reducing shoulder 134 which matingly receives the reducing shoulder 132 of the cylinder 20.

Turning now to FIGS. 5 through 5c, several flow control positions of the cylinder 20 and sleeve 22 are described. When the cylinder 20 is in a closed position such as that shown in FIG. 5, there is no fluid communication between the orifices 90 of the sleeve 22 and the orifices 68 of the cylinder 20. Therefore no fluid flows through the orifices 90 of the sleeve 22 and the orifices 68 of the cylinder 20 into the chamber 112 of the cylinder 20.

Referring to FIG. 5a, a nearly open position of the cylinder 20 and sleeve 22 is shown. The cylinder 20 has been rotated to position the orifices 68 of the cylinder 20 to be in near fluid communication with the orifices 90 of the sleeve 22.

A partially open position of the cylinder 20 and sleeve 22 is illustrated by FIG. 5b. In this position, about fifty percent of the area of the cylinder orifices 68 are open to the sleeve orifices 90. Fluid flows through the sleeve orifices 90 and cylinder orifices 68 into the chamber 112 of the cylinder 20 at about half the maximum flow rate of the valve 10.

Finally, the fully open position of the sleeve 22 and cylinder 20 is shown in FIG. 5c. In this position, the sleeve orifices 90 and cylinder orifices 68 are in complete alignment and maximum fluid flow occurs through the orifices 90 and 68 into the chamber 112 of the cylinder 20.

Positions of the rotatable disc 18 and stationary disc 16, comparable to those of the sleeve 22 and cylinder 20, are shown in FIGS. 6 through 6c. In these drawing figures, it should be appreciated that the stationary disc 16 is positioned beneath the rotatable disc 18 and is, for the most part, not visible. In FIGS. 6, 6a and 6b, the orifices 44 of the stationary disc 16 are shown in broken lines.

Referring first to FIG. 6, a fully closed position of the rotatable disc 18 and stationary disc 16 is described. In this closed position, there is no fluid communication between the orifices 54 of the rotatable disc 18 and the orifices 44 of the stationary disc 16.

A nearly open position of the rotatable disc 18 and the stationary disc 16 is illustrated by FIG. 6a. The rotatable disc 18 has been turned to a position where the orifices 54 of the rotatable disc 18 are almost open to the orifices 44 of the stationary disc 16.

With reference now to FIG. 6b, a partially open position of the rotatable disc 18 and stationary disc 16 is shown. The rotatable disc 18 has been turned to place the orifices 54 of the rotatable disc 18 in fluid communication with the orifices 44 of the stationary disc 16. In this position, the valve 10 is about fifty percent open for fluid flow from the chamber 112 of the cylinder 20 to the outlet port 32.

The fully open position of the rotatable disc 18 and stationary disc 16 is illustrated by FIG. 6c. In this position, the orifices 54 of the rotatable disc 18 completely align with the orifices 44 of the stationary disc 16. Thus this position allows maximum flow through the orifices 54 and 44 to the outlet port 32.

It should be understood that the cylinder 20 and the rotatable disc 18 are connected for simultaneous rotation. With this construction, when the sleeve orifices 90 and cylinder orifices 68 are closed (FIG. 5), the disc orifices 54 and 44 are also closed (FIG. 6). Similarly, when the sleeve orifices 90 and cylinder orifices 68 are half open (FIG. 5b), the disc orifices 54 and 44 are half open (FIG. 6b). In other words, the degree of fluid communication through the cylinder orifices 68 and sleeve orifices 90 is substantially equal to the degree of fluid communication through the rotatable disc orifices 54 and the stationary disc orifices 44 at all times.

With reference now to FIG. 7, the position indicator band 106 is described. The indicator band 106 has a scale 140 which shows the range of valve positions. The scale 140 is expressed in percent open, from zero percent open to one-hundred percent open. The position indicator band 106 may also have a scale 142 which shows the equivalent diameter corresponding to the area of fluid flow through the two sets of orifices. The arrow 115 or marker on the cover 24 points to the scales 140 and 142 on the indicator band 106 to provide visual indicia of the flow control position the valve 10.

OPERATION

In operation, the flow control position of the valve 10 is changed by turning the hub 26. As the hub 26 is turned, the valve stem 72 and cylinder 20 rotate to change the relative positions of the cylinder orifices 68 and the sleeve orifices 90. Turning the hub 26 changes the flow allowed from the inlet port 30 into the chamber 112 of the cylinder 20 by increasing or decreasing the area of fluid communication through the sleeve orifices 90 and cylinder orifices 68.

Because the rotatable disc 18 is linked to the cylinder 20, the rotatable disc 18 turns with the cylinder 20. Rotation of the rotatable disc 18 changes the relative positions of the rotatable disc orifices 54 and the stationary disc orifices 44. Thus turning the hub 26 also changes the flow allowed from the chamber 112 of the cylinder 20 to the outlet port 32 through the disc orifices 54 and 44.

Returning now to FIGS. 2 and 4, installation of the various components in the valve 10 is described. With the cover 24 unbolted and removed from the access opening 34, the wear sleeve 14 is first installed. As mentioned previously, the wear sleeve 14 may be pressed into position or may be held in place with securing pins (not shown).

Next the stationary disc 16 is installed with the pins 46 extending into the pin openings of the valve body 12 to prevent rotation of the stationary disc 16. The elastomeric O-ring seal 120 is secured in place to provide a fluid seal between the stationary disc 16 and the valve body 12.

The rotatable disc 18, the cylinder 20 and the sleeve 22 are inserted next. The pins 130 link the rotatable disc 18 with the cylinder 20 and the pins 124 prevent rotation of the sleeve 22. The elastomeric O-ring 126 is installed to provide a fluid seal between the sleeve 22 and the valve body 12.

Then the cover 24 is installed with the valve stem 72 journaled through the valve stem bore 98 of the cover 24. The elastomeric O-rings 114 are placed in their respective annular grooves before the cover 24 is installed. The cover 24 is secured to the valve body 12 with bolts. Finally, the hub 26 is attached to the end 74 of the valve stem 72 to complete the installation of valve components.

Removal of the valve components is basically a reversal of the installation procedure. It may be desired to remove valve components to replace worn parts or to change the size of the orifices.

It should be appreciated that the construction of the valve 10 allows easy replacement of any of the components. With the top entry design, the valve 10 need not be disconnected from the flow line in order to replace valve components. Moreover, the use of securing pins to assembly the stationary disc 16, rotatable disc 18, the cylinder 20 and the sleeve 22 allows individual or group replacement of these valve components.

Furthermore, it should be understood that the valve 10 may constructed for numerous ranges of pressure drops by varying the relative sizes, shapes and locations of the discs 16 and 18, the disc orifices 44 and 54, the chamber 112 of the rotatable cylinder 20, and the cylinder and sleeve orifices 68 and 90.

Changes may be made in the combinations, operations and arrangements of the various parts and elements described herein without departing from the spirit and scope of the invention as defined in the following claims.

What is claimed is:

1. A flow control valve comprising:
   a body having an inlet port, an outlet port, and a side wall with an access opening, the body having a cavity communicating with the access opening, the outlet port and the inlet port;
   a cover removably attached to the body to close the access opening;
   a stationary disc secured within the cavity of the body and having a plurality of orifices therethrough, wherein the orifices of the stationary disc are in fluid communication with the outlet port;
   a rotatable disc positioned within the cavity of the body adjacent to the stationary disc and having a plurality of orifices therethrough, the orifices of the rotatable disc being located for the rotatable disc to be turned between an open position wherein the orifices of the stationary disc and the orifices of the rotatable disc allow a degree of fluid communication therethrough and a closed position wherein the rotatable disc obstructs fluid communication through the orifices of the stationary disc to the outlet port;
   a sleeve secured within the cavity of the body and having a bore therethrough and a side wall with a plurality of orifices extending therethrough into the bore of the sleeve, wherein the orifices of the sleeve are in fluid communication with the inlet port;
   a rotatable cylinder positioned within the bore of the sleeve and having an open end facing the rotatable disc and an opposite closed end, the open end penetrating into the cylinder to form a chamber, the cylinder having a side wall with a plurality of orifices therethrough into the chamber of the cylinder, the orifices of the rotatable cylinder being located for the cylinder to be turned between an open position wherein the sleeve orifices and cylinder orifices allow a degree of fluid communication therethrough and a closed position wherein the sleeve obstructs fluid communication through the cylinder orifices from the inlet port; and
   valve means for rotating the cylinder and the rotatable disc to adjust the degree of fluid communication through the sleeve orifices and the cylinder orifices and through the rotatable disc orifices and the stationary disc orifices.

2. The flow control valve of claim 1 wherein the valve means rotates the cylinder and the rotatable disc simultaneously.

3. The flow control valve of claim 1 wherein the cover has a valve stem bore therethrough and the valve means comprises:
   a valve stem extending from the closed end of the rotatable cylinder through the valve stem bore and having an end protruding through the cover;
   wherein the open end of the cylinder is attached to the rotatable disk and wherein the cylinder and the rotatable disk turn simultaneously in response to rotation of the valve stem.

4. The flow control valve of claim 3 further comprising:
   a hub attached to the protruding end of the valve stem, wherein the hub is adapted for rotation to turn the valve stem.

5. The flow control valve of claim 4 further comprising:
   an indicator band attached to the hub; and
   a position marker on the cover proximate to the indicator band of the hub;
   wherein the indicator band and the position marker cooperate to provide visual indicia of the degree of fluid communication from the inlet port to the outlet port of the body.

6. The flow control valve of claim 3 further comprising:
at least one elastomeric seal positioned between the valve stem and the valve stem bore.

7. The flow control valve of claim 1 further comprising:
at least one elastomeric seal positioned between the cavity of the body and the cover.

8. The flow control valve of claim 1 further comprising:
at least one elastomeric seal positioned between the cavity of the body and the sleeve.

9. The flow control valve of claim 1 further comprising:
at least one elastomeric seal positioned between the cavity of the body and the stationary disc.

10. The flow control valve of claim 1 wherein at least a portion of the rotatable disc is positioned within the bore of the sleeve.

11. The flow control valve of claim 1 further comprising:
an inlet annular shoulder formed in the body within the cavity, wherein the inlet annular shoulder faces the sleeve and matingly receives the sleeve in the cavity.

12. The flow control valve of claim 1 further comprising:
an outlet annular shoulder formed in the body within the cavity at the outlet end of the cavity; and
a wear sleeve having an inlet end facing the stationary disc and an outlet end abutting the outlet annular shoulder;
wherein the outlet annular shoulder is sized to matingly receive the outlet end of the wear sleeve.

13. The flow control valve of claim 1 further comprising:
an intermediate annular shoulder formed in the body within the cavity, wherein the intermediate annular shoulder faces the stationary disc and matingly receives the stationary disc in the cavity.

14. The flow control valve of claim 1 further comprising:
a pair of disc pins removably connecting the stationary disc and the body to prevent rotation of the stationary disc within the cavity of the body.

15. The flow control valve of claim 1 further comprising:
a pair of sleeve pins removably connecting the sleeve and the body to prevent rotation of the sleeve within the cavity of the body.

16. The flow control valve of claim 1 wherein the inlet port and outlet port are threaded.

17. The flow control valve of claim 1 wherein the cover has a flange with a plurality of bolt holes therethrough and the body has a plurality of threaded bolt holes around the access opening and aligning with the bolt holes of the flange and wherein the cover is removably attached over the access opening with a threaded bolt extending through each bolt hole of the flange and into threaded engagement with the aligning threaded bolt hole in the body.

18. The flow control valve of claim 1 wherein the orifices of the sleeve are diametrically opposed.

19. The flow control valve of claim 1 wherein the orifices of the rotatable cylinder are diametrically opposed.

20. The flow control valve of claim 1 wherein the degree of fluid communication through the sleeve and cylinder orifices is substantially equal to the degree of fluid communication through the orifices of the rotatable disc and stationary disc at all positions of rotation of the cylinder and rotatable disc.

21. A flow control valve comprising:
a body having a sidewall, an inlet port, an outlet port and a cavity communicating with the inlet port and the outlet port;
a pair of discs positioned within the cavity, each disc having a plurality of orifices therethrough, one of the discs being rotatable between an open position wherein the orifices of the discs allow fluid flow therethrough and a closed position wherein the orifices of one disc are unaligned with the orifices of the other disc to prevent fluid flow through the cavity of the body;
a sleeve secured within the cavity of the body and having a bore therethrough and a sidewall with a plurality of orifices extending therethrough into the bore of the sleeve; and
a cylinder positioned within the bore of the sleeve and having an open end, a closed end and a sidewall, the open end extending into the cylinder to form a chamber, the sidewall having a plurality of orifices therethough into the chamber of the cylinder, and the cylinder being rotatable between an open position wherein the cylinder orifices and the sleeve orifices allow fluid flow therethrough and a closed position wherein the cylinder orifices and the sleeve orifices are unaligned to prevent fluid flow through the cavity of the body.

22. The flow control valve of claim 21 wherein the sleeve and the cylinder are located toward the inlet port and the discs are located toward the outlet port.

23. The flow control valve of claim 21 wherein the sidewall of the body has an access opening communicating with the cavity of the body.

24. The flow control valve of claim 23 further comprising:
a cover removably attached to the body to close the access opening.

* * * * *